April 1, 1947.     J. W. FRENCH     2,418,298
TELESCOPIC OPTICAL OBSERVATION INSTRUMENT
Filed May 25, 1943

James Weir French.
Inventor
Hewitt Griggs Robertson
By
Attorney

Patented Apr. 1, 1947

2,418,298

UNITED STATES PATENT OFFICE 2,418,298

TELESCOPIC OPTICAL OBSERVATION INSTRUMENT

James Weir French, Glasgow, Scotland, assignor to Barr & Stroud, Limited, Glasgow, Scotland Application May 25, 1943, Serial No. 488,407
In Great Britain June 6, 1940

2 Claims. (Cl. 88—32)

For adjustment purposes, optical observation instruments commonly have a body or casing of tubular character embodying two coaxial tubular or annular parts which are relatively movable axially the one upon the other. Thus, telescope instruments such as monocular telescopes and binoculars are usually of this construction at the eyepiece end, there being an eyecap member which is adjustable axially upon an eyepiece member of corresponding form for focussing purposes. It is to instruments with relatively movable parts of this nature that the present invention refers.

It is desirable that moisture should not pass between the relatively movable parts and enter the interior of the instrument, and the object of the present invention is to provide in an improved manner for the sealing of such relatively movable parts.

According to this invention there is provided a flexible water-proof sealing member of tubular form, hereinafter referred to as the sealing sleeve, which on the one hand closely encircles the outer of the two relatively movable parts and on the other hand closely encircles the inner of the two parts in such a way that the sealing sleeve, while bearing all round on one of the parts, is capable of sliding movement, either rotary or longitudinal, relative to that part, but is engaged with the other part in such a way as to be constrained to move with that part relative to the first part, the sealing sleeve thus forming an impervious cover over the junction of the two parts.

Usually the sealing sleeve is composed of rubber designed to act contractively on the two relatively movable parts, and it may make contact directly with the part relative to which it is slidable, or it may have a contact facing applied to it for sliding movement on that part. Such contact facing may be of metal or metallic paint, fabric, felt or leather. According to a modification, a contact facing may be provided on the part relative to which the sleeve is slidable, instead of on the sleeve.

The sleeve may have scale markings upon it to indicate the state of adjustment of the movable parts. For example, in the case of a focussing eyepiece, the sleeve may have dioptric scale markings.

The invention as applied to the eyepiece of a prismatic binocular instrument will now be described with reference to the accompanying drawing, in which.

The part of the instrument shown comprises an objective casing A, a prism casing B, and an eyepiece C.

Figure 1:
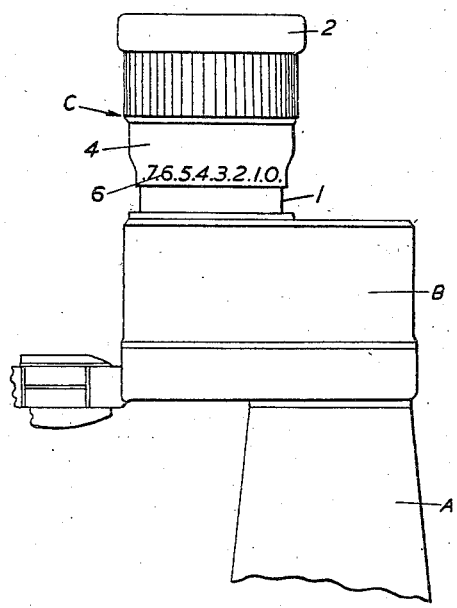
Figure 1 is an outside view of the eyepiece end of one limb of the instrument.
Figure 2:
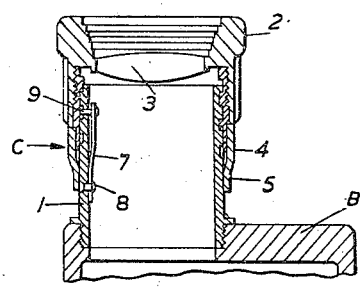
Figure 2 is a corresponding sectional view.

The eyepiece C in Figures 1 and 2 is made up of an eyepiece tube 1 which is screwed into the prism casing B, and an eyecap 2 which carries the eye lens 3. For focussing adjustment, the eyecap 2 is in screw engagement with the eyepiece tube 1 so that rotational movement of the eyecap 2 produces axial movement of the eyecap and lens 3.

To prevent the penetration of moisture between the eyecap 2 and the eyepiece tube 1, a rubber sealing sleeve 4 is fitted. This sleeve 4 grips the end portion of the eyecap 2 so firmly as to bind thereon. At its other end 5 the sealing sleeve 4 bears upon the surface of the eyepiece tube 1 but the degree of pressure exerted between the sleeve 4 and the eyepiece tube 1 is such as to allow of axial and rotational sliding movement of the sleeve relative to the eyepiece tube 1, i. e. the sealing sleeve 4 does not bind upon the eyepiece tube 1. The sleeve 4 thus moves with the eyecap relative to the eyepiece tube 1, sliding on the outside surface of the eyepiece tube 1. By means of this sleeve 4 the joint between the two movable parts 1 and 2 is effectively sealed.

In Figure 1 a dioptric scale is shown at 6 on the sealing sleeve. The figures of the scale are embossed on the rubber. They may be coloured to make them stand out more clearly.

As a dioptric scale such as 6 may not be visible in the dark, the eyepiece may be provided with a device of clicker type by means of which, as the eyecap 2 is moved relative to the eyepiece tube 1, a succession of clicks is heard or felt. By counting these clicks the observer can tell the state of adjustment of the eyecap. This device as shown in Figure 2 comprises a spring tongue 7 within the tube 1, with one end secured thereto at 8 and at its other end provided with a pin 9 which passes through a hole in the tube 1 and bears on the inner surface of the eyecap 2. The latter has a series of indentations or the like, on engagement of which by the spring-pressed pin 9 the clicking sound is caused.

Figure 3:
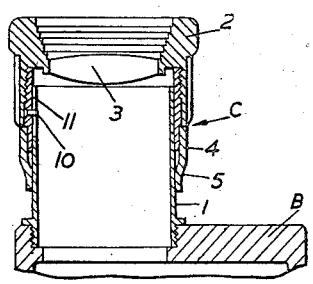
Figure 3 is a sectional view showing a modified form of eyepiece.

The eyepiece C shown in Figure 3 focusses with a direct axial sliding movement of the eyecap 2 on the eyepiece tube 1, instead of with a screw action, a pin 10 on the eyecap engaging with a longitudinal slot 11 in the eyepiece tube 1.

Figure 4:
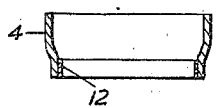
Figure 4 shows a modified form of sealing sleeve.

In both examples just described, the sealing sleeve 4 bears directly on the eyepiece tube 1. It may, however, as shown in Figure 4, have a contact facing applied to it for this purpose. This contact facing 12 may be in the form of a thin metal ring, composed for example of stainless steel or of a non-ferrous metal highly polished, or a coating of a metallic paint, or the inside of the rubber sleeve 4 may be sprayed with felt to provide the facing 12, or woven tape may be applied, or a facing of leather such as fine kid may be used, this being made from a flat ring of leather by beating it out into a short tube, it being desirable to obtain a jointless contact facing.

I claim:

1. An optical observation instrument having co-axial tubular or annular parts movable axially the one on the other and provided with a sealing member of tubular form, composed of a sealing sleeve of elastic waterproof material, extending over the junction of the two relatively movable parts, the sealing sleeve being wholly external to the two relatively movable parts and closely encircling both parts but being capable of sliding relative to one part while firmly gripping the other part so that the sleeve moves bodily with the latter part, thus forming an impervious cover over the junction, the sleeve having a smooth flexible contact facing applied to it for the sliding action.

2. In a telescoping optical observation instrument having coaxial tubular parts movable axially relative to each other with one extending beyond the other, a radially resilient sealing sleeve on the outer of said tubular parts and attached thereto with a strong bearing pressure by its inherent resiliency, so as to bind thereon and move with said outer part, the sleeve having an annular extension extending radially inwards of the remainder of the sleeve and being radially contractible and with its inner surface contacting the inner tubular part around its periphery over a substantial area, but with substantially less bearing pressure than that on the outer tubular part so as to slide on said inner part when the outer part is moved relative thereto, whereby a closely bearing non-return moisture seal is provided over the junction between the inner and outer parts and allowing free relative movement between inner and outer parts.

JAMES WEIR FRENCH.

REFERENCES CITED

The following references are of record in the file of this patent:

UNITED STATES PATENTS

| Number | Name | Date |
|---|---|---|
| 2,320,504 | Bailey | June 1, 1943 |
| 1,479,409 | Edstrom | Jan. 1, 1924 |
| 1,324,448 | Greiner | Dec. 9, 1919 |
| 1,952,224 | Trautmann, et al. | Mar. 24, 1934 |
| 1,267,596 | Schleinzer | May 28, 1918 |
| 2,155,570 | Trautmann | Apr. 25, 1939 |
| 2,184,351 | Langsner | Dec. 26, 1939 |
| 2,150,629 | Mossberg | Mar. 14, 1939 |
| 1,921,413 | Kindelmann | Aug. 8, 1933 |
| 1,608,726 | De Zeng | Nov. 30, 1926 |
| 1,780,945 | Sapier | Nov. 11, 1930 |
| 2,126,300 | Wittel | Aug. 9, 1938 |
| 2,053,583 | Summers | Sept. 8, 1936 |
| 958,862 | Durham | May 24, 1910 |

FOREIGN PATENTS

| Number | Country | Date |
|---|---|---|
| 300,015 | German | Sept. 26, 1919 |